Feb. 12, 1957　　　V. M. URBAN　　　2,781,457
AUTOMATIC PARALLELING DEVICE
Filed May 17, 1955
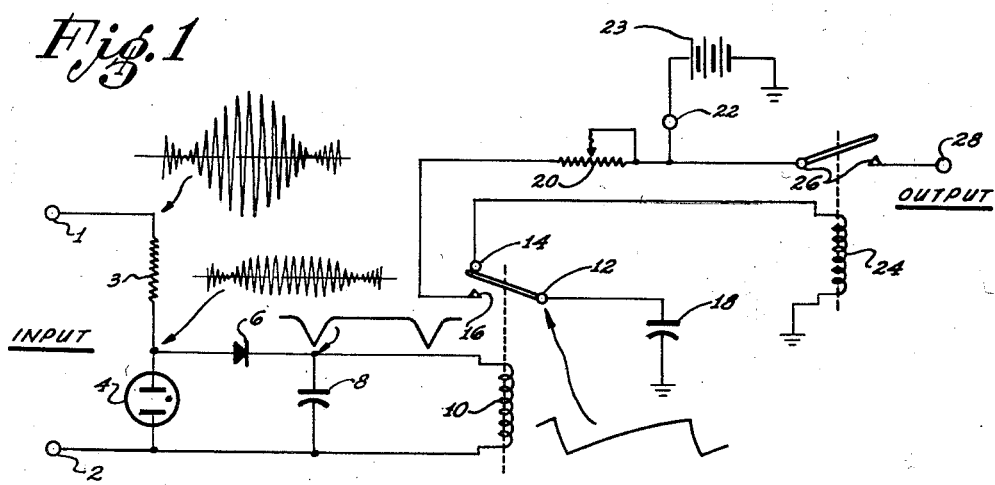
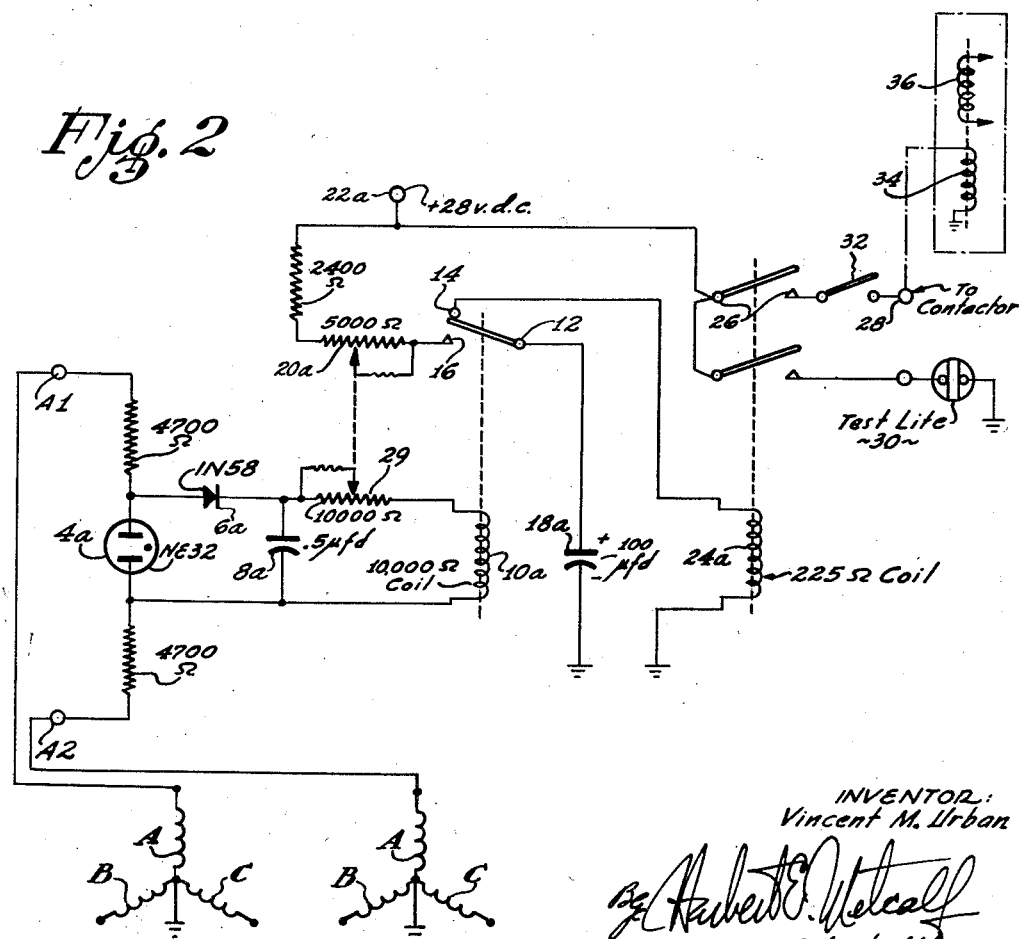
INVENTOR:
Vincent M. Urban
His Patent Attorney

United States Patent Office 2,781,457
Patented Feb. 12, 1957

2,781,457
AUTOMATIC PARALLELING DEVICE

Vincent M. Urban, Los Angeles, Calif., assignor to Northrop Aircraft, Inc., Hawthorne, Calif., a corporation of California Application May 17, 1955, Serial No. 509,031

10 Claims. (Cl. 307—87)

The present invention relates to electrical apparatus, and more particularly, to a means for automatically connecting together two alternators at the in-phase condition while the alternators are operating. This paralleling of alternators is often necessary to provide uninterrupted power supply to an electrical load, particularly in three-phase alternating current systems.

An object of this invention is to provide a very sensitive and simple circuit arrangement wherein the in-phase condition of two running alternators will be sensed and a switch automatically closed to perform control of paralleling contacts in the outputs of the alternators at exactly the correct instant.

A further object of the present invention is to provide an automatic paralleling device whereby two alternators operating at an excessive difference in frequency, say several cycles per second, will not be paralleled even though an indication is obtained each time they pass through the in-phase relationship.

Still another object is to provide means in the automatic paralleling device for adjusting the timing of the output switch actuation to accommodate different predetermined limits of frequency difference between the alternators and compensate for time delay in the output relays.

Briefly, my invention comprises an input circuit having a resistance and a glow tube connected in series, the ends of this series combination being adapted to be connected to respective voltages from similar phases of two alternators. Output across the glow tube is rectified and filtered and fed to a first relay to switch a condenser between a charging position and a discharging position across an output relay. Variable resistances may be included in the condenser charging circuit and in series with the first relay.

The invention will be more fully understood by reference to the following detailed description of preferred apparatus, and to the accompanying drawings.

In the drawings:

Figure 1 is a schematic diagram showing the basic elements of an automatic paralleling device connected in accordance with the present invention.

Figure 2 is a schematic diagram showing an improved, practical circuit for use with two 115-volt, three-phase, 400 C. P. S. alternators.

Referring first to Figure 1, a resistor 3 and a glow discharge tube 4 are connected in series across a pair of input terminals 1 and 2. A filter including a rectifier 6 and capacitor 8 is operatively connected directly across the glow tube 4, and a first relay coil 10 is connected as a load across the filter capacitor 8. The first relay is a single-pole double-throw relay having a pole 12, "off" or normally closed contact 14, and "on" or normally open contact 16.

A control capacitor 18 is connected from the pole 12 to ground, this being the negative side of a D. C. power supply. A control resistance 20 is connected from "on" contact 16 to a positive terminal 22 adapted to be connected to the D. C. power supply, such as a battery 23 for example. An output relay coil 24 is connected between "off" contact 14 and ground. Output relay contacts 26 are shown as being in series with positive terminal 22 to close the circuit to an output terminal 28.

In operation, A. C. voltages from similar phases of two alternators (not shown in Figure 1) are fed to input terminals 1 and 2, respectively. The two alternator electrical systems will naturally be assumed to have a common reference connection such as a common ground bond. The voltage appearing across resistor 3 and glow tube 4 will be the vector difference of the two alternator voltages. This voltage will be maximum when the two alternators are 180 electrical degrees out of phase and zero when in phase, with the zeros recurring at the frequency difference between the two alternators.

Regulating action of the glow tube 4 limits or clips the maximums from the input voltage difference portion appearing across the glow tube, as shown by the waveforms in Figure 1. This limited or clipped voltage is fed through the simple filter circuit to the first relay 10. The rectifier 6 may be connected in either direction. As a result of the voltage limiting means, a very sensitive relay can be used, so that its contacts 14 and 16 will open and close very close to the zero voltage or in-phase points without having to withstand the input voltage maximums. The voltage across the tube 4 is limited to approximately 60 volts.

As the voltage increases after passing the alternator in-phase point, relay 10 will be energized to connect pole 12 with "on" contact 16 to allow control capacitor 18 to begin charging from the D. C. supply potential (commonly 28 volts) through control resistance 20. Approach to the next "in-phase" point will allow first relay 10 to "drop out" and connect control capacitor 18 in a discharging circuit through the output relay coil 24. If the charging time, as regulated by control resistance 20, is long enough, the momentary contact of the charged capacitor to the output relay coil 24 will be sufficient to operate the relay and thus close the output contacts 26. This in turn will be used to energize and latch a further relay actually closing the heavy current carrying line contactors of all phases of the alternators. Even though first relay 10 drops out slightly before the in-phase point, the time delays in the closing of the output contacts 26 and of the final contactors can permit actual paralleling to occur exactly when the alternators are in phase.

The circuit can be arranged so that paralleling will not occur unless the frequency difference between the two alternators is within predetermined limits. This is accomplished by choosing or adjusting control resistance 20 so that sufficient time must occur between in-phase points before control capacitor 18 will receive sufficient charge to actuate output relay 24 upon discharge.

A preferred embodiment is shown in more detail in Figure 2, with two three-phase alternators shown connected to the input terminals A1 and A2, respectively. Tube 4a is preferably a neon lamp of about a one watt power rating. The coil resistance of relay 10a should be greater than that of the total resistance in series with the tube 4a, to provide the least distortion of the voltage waveform across the tube. With reference to a 400 C. P. S. signal, the time constant of filter condenser 8a in conjunction with the resistance of coil 10a should be from .005 to .05 second, to filter the 400-cycle ripple but not distort the dips to zero voltage at a maximum frequency difference of 10 to 20 C. P. S. of the two alternators.

With the range of variable resistance provided by the 5000-ohm potentiometer 20a included in the control capacitor circuit, paralleling will occur for a difference frequency of two C. P. S. or less with minimum resistance of the adjustment, or at one-half C. P. S. or less with maximum resistance. Oppositely variable resistance in the form of the 10,000-ohm potentiometer 29 in the relay circuit is included to reduce the sensitivity of the first relay 10a when the circuit is adjusted for the greater frequency difference, and thus compensate for the fixed time delay in the output relay and line contactor.

Capacitor 18a must be large enough to close the succeeding relay contacts 26 for a period of about .05 second. It is possible to connect the control capacitor output to the contactor relay or coil directly, and the present invention contemplates this circuit form also. The inclusion of output relay 24a is preferred instead of having the control capacitor output pulse go directly to the contactor, because of the higher current requirements of the contactor and because a larger value of capacitor 18a would probably be required. The time constant of capacitor 18a and coil resistance of relay 24a should be chosen so that capacitor 18a will repeatedly completely discharge at frequency differences as high as 10 to 20 C. P. S. A further advantage of including output relay 24a in the circuit is that a control voltage different from that of positive supply terminal 22a can be used for the contactor-closing circuit through contacts 26.

A test light 30 can be connected as shown in Figure 2, or in any other desired manner for test purposes. In addition, an operating switch 32 can be incorporated in series with the output contacts 26, for example, to choose the desired time for paralleling. As illustrated, a contactor "close" relay coil 34 may be connected to the output terminal 28, and an associated "trip" relay coil 36 may be adapted to be separately energized to disconnect the two alternators. The contactor relay will preferably be of the latching type, but if not, output relay 24a can be arranged with a holding circuit which will supply continuous current rather than a pulse.

It is thus seen that the use of a device such as disclosed herein will provide greater ease and safety than manual methods for paralleling A. C. power supplies and is adaptable to multiple alternator systems, either on the ground or airborne. The adjustments provided enable optimum operation for any specialized application, and the components used are all standard readily available parts.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. Alternator paralleling apparatus comprising input means including a resistance and a glow discharge tube connected in series, output circuit means including rectifier and filter means connected across said glow tube in position to rectify alternating current impressed across said tube, a first relay having a coil connected across the output of said filter means and having single-pole double-throw contacts, means for connecting the normally open contact to one side of a D. C. voltage supply, a control capacitor connected at one end to the pole of said contacts and adapted to be connected at the other end to the opposite side of the D. C. supply, and an output relay coil connected between the normally closed contact and said opposite side, said output relay coil operatively associated with switching contacts adapted to be in control of the main paralleling contactors of two alternators.

2. Alternator paralleling apparatus comprising an input circuit including a resistance and a glow discharge tube connected in series across a pair of input terminals adapted to be connected respectively to leads from similar phases of two alternators to be paralleled, rectifier and filter means connected across said glow tube, a first relay having a coil connected across said filter means and having single-pole double-throw contacts, variable resistance means connected at one end to the normally open contact of said first relay and adapted at its other end to be connected to one side of a D. C. power supply, a control capacitor connected at one end to the pole of said first relay and adapted at its other end to be connected to the opposite side of the D. C. supply, an output relay coil connected between the normally closed contact of said first relay and said other end of said control capacitor, and switching contacts operatively associated with said output relay coil and adapted to be connected in a control circuit for closing the main paralleling contactors of the two alternators when said output relay is actuated.

3. Alternator paralleling apparatus comprising an input circuit connectable at two points to similar respective phases of two alternators to be paralleled, said input circuit including voltage limiting means for obtaining a limited amplitude waveform having zero points at the times of in-phase relationship of the alternators, a control capacitor, means connected to said voltage limiting means for charging said capacitor at a desired rate during time periods between said zero points, electric actuating means, means for discharging said capacitor through said actuating means during time periods corresponding to said zero points, and switching means operatively associated with said actuating means and adapted to be connected in a control circuit for closing the paralleling contactors of the two alternators when said actuating means is actuated.

4. Apparatus in accordance with claim 3 wherein said means for charging and discharging said capacitor include a single-pole double-throw relay having a coil, and means connecting said coil across said voltage limiting means.

5. Automatic alternator paralleling means comprising an input circuit connectable at two points to similar respective phases of two alternators to be paralleled, a control capacitor, means connected to said input circuit for charging said capacitor at a desired rate during time periods between zero voltage points occurring across said input circuit, electric actuating means, means for discharging said capacitor through said actuating means during time periods corresponding to said zero points, and switching means operatively associated with said actuating means for closing the paralleling contactors of the two alternators when said actuating means is actuated.

6. Apparatus in accordance with claim 5 wherein said means for charging and discharging said capacitor comprise a single-pole double-throw relay having a coil, means operatively connecting said coil to said input circuit to be energized by out-of-phase alternator voltages occurring therein, means including contacts of said relay for connecting a source of D. C. potential to said capacitor when said coil is energized, and means including other contacts of said relay for disconnecting said D. C. potential and connecting said actuating means across said capacitor when said coil is not energized at said zero points, whereby when the two alternators are substantially at the same frequency, said capacitor will have received sufficient charge to actuate said actuating means as said alternators reach an in-phase point.

7. Automatic alternator paralleling means comprising a pair of input terminals, a resistance and a glow discharge tube connected in series between said input terminals, a rectifier and filter capacitor connected in series across said glow tube, a first relay having a coil and having single-pole double-throw contacts, means connecting said first relay coil across said filter capacitor, means connecting the normally open contact of said first relay to one side of a D. C. power supply, a control capacitor connected between the pole and the opposite side of the D. C. supply, an output relay coil connected between the normally closed contact and the opposite side of the D. C. supply, said output relay coil operatively associated with switching means adapted to be in control of paralleling contactors of two alternators.

8. Apparatus in accordance with claim 7 wherein said means connecting said first relay coil across said filter capacitor includes a variable series resistance between said capacitor and coil.

9. Apparatus in accordance with claim 7 wherein said means connecting said first relay coil across said filter capacitor includes a variable series resistance between said capacitor and coil, wherein said means connecting said normally open contact to said D. C. power supply includes a second variable resistance, said variable resistances being ganged together for oppositely varying resistance thereof with unidirectional control movement.

10. Apparatus in accordance with claim 7 wherein said means connecting said normally open contact of said first relay to one side of said D. C. power supply includes a variable resistance.

References Cited in the file of this patent

UNITED STATES PATENTS 2,480,678     Skudre                Aug. 30, 1949